the present invention relates to safety devices and more particularly to a water measuring device particularly suitable for use in fuel systems on aircraft.

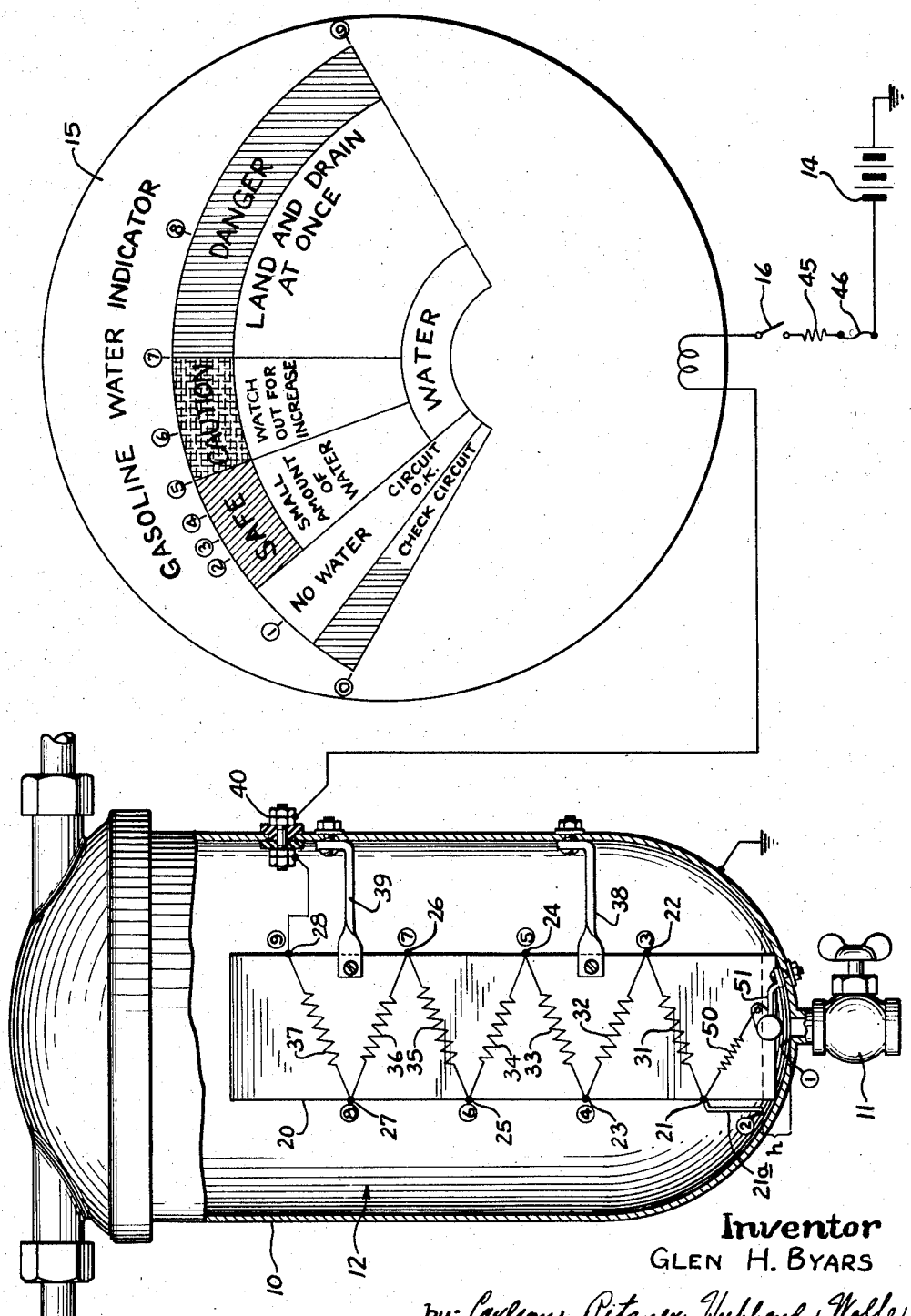

2,884,785

WATER MEASURING DEVICE FOR FUEL SYSTEM OR THE LIKE

Glen H. Byars, Kearney, Nebr.

Application June 5, 1956, Serial No. 589,465

5 Claims. (Cl. 73—304)

The present invention relates to safety devices and more particularly to a water measuring device particularly suitable for use in fuel systems on aircraft.

One of the greatest hazards of private and commercial aviation is "water in the gas," since the resultant stoppage of the engine on take-off may be disastrous and since stoppage in normal flight is accompanied by substantial risk, the terrain frequently being unsuitable for an emergency landing. Steps are taken in the gasoline storage facility at large air fields to keep the water, resulting from condensation in the storage tanks, down to negligible amounts. However, in smaller or remote air fields there is more opportunity for condensation to occur and no means provided for regular water removal. As much as a cup of water may be taken in a single load of gasoline, which is beyond the capacity of the bowl or trap normally provided on the airplane.

In a practical case, following the taking on of the load of gasoline containing water, there may be enough "dry" gasoline in the carburetor and fuel lines associated therewith to get the engine started on the take-off, only to have the engine fail at the end of the runway or before a safe height is achieved.

Gasoline systems on aircraft are so arranged that the water in the gasoline tank, being heavier than the gasoline, drains down to the bowl immediately when the tanks are filled. It is the practice of conservative pilots to drain the bowl after taking on each load of fuel and before each flight. This is, however, a messy and awkward operation, since the bowl or trap is usually not readily accessible or visible, requiring portions of covering to be removed. Furthermore, such draining is accompanied by a fire hazard due to the spillage of raw gasoline, to say nothing of the waste.

Accordingly, it is an object of the invention to provide a novel watering measuring device for a fuel system which is absolutely reliable and which provides positive indication of the presence and amount of water.

It is another object to provide a water measuring device which is "fail safe" and which gives immediate indication to the operator in the event of any abnormality in the measuring apparatus.

It is a further object, related to the foregoing, to provide a water measuring device which is sensitive and which gives indication of a minimum amount of water in the bowl, but which is, nevertheless, suitable for calibration to indicate the actual depth of water in appreciable quantity.

It is still another object to provide a water measuring device which utilizes electricity from the airplane battery, but which is so constructed that the current, in association with the gasoline, cannot constitute a hazard either under normal operating conditions or under any conceivable condition of circuit abnormality.

It is yet another object to provide a water measuring device which is simple and fool-proof, which may be used universally in the bowls or traps associated with any fuel system, and which is applicable to existing bowl designs with minor modification or expense.

It is yet another object to provide a water measuring device which may be inexpensively incorporated into new airplanes and which may be provided in the form of a modification kit for existing airplanes with low installation expense. Once installed, there is no maintenance or upkeep required.

Other objects and advantages of the invention will become apparent upon studying the attached detailed description and upon reference to the drawing in which:

The figure shows a water measuring system constructed in accordance with the present invention with the bowl or trap in partial section and with certain electrical components indicated schematically.

While I have shown and described a preferred form of the invention, it will be understood that I do not intend to limit the invention to such preferred form, but intend to cover such modifications and alternative constructions and uses as may be defined by the scope of the claims appended hereto.

Referring now to the drawing, the bowl or trap conventionally used in an aircraft fuel system is indicated at 10, being provided with a drain valve 11. It will be understood that the bowl is normally placed at the lowermost point of the system so that water will tend to drain from the lines and tanks, collecting at the bottom of the bowl. In conventional practice the valve 11 is opened to permit the water, and usually some of the gasoline as well, to escape, after which the valve is retightened.

In the present device an electrical circuit is provided which comprises a detector 12 in the bowl capable of undergoing a change of resistance in the presence of water together with a source of current 14 and means, such as an indicating meter 15, located in the cockpit and calibrated in terms of the amount of water present. The device is turned on and off by a series switch 16 which may also be located in the cockpit.

In accordance with the present invention, the circuit includes a series of electrodes within the bowl 10 at progressive heights above the bottom and interconnected by resistors, the resistance of the resistors being high as compared to the resistance of water so that the resulting current in the circuit is a measure of the level of water within the bowl. More specifically, I provide within the bowl a strip of insulating material 20 having electrodes in the form of terminals 21-28 inclusive, at progressive heights above the bottom of the bowl with adjacent ones of the electrodes being interconnected by resistors 31-37 inclusive. The strip of insulation 20 may be secured in place within the bowl on brackets 38, 39 as shown. A connection from the uppermost one of the electrodes, in the present instance electrode 28, is brought out through an insulator 40 to the indicating meter 15. Conveniently, current may be supplied to the load circuit comprising the series-connected resistors from the usual storage battery of the airplane which, in the exemplary embodiment, may have a voltage of twelve volts. Preferably a metallic bowl is used which is grounded to the engine structure as indicated. In a practical case the battery 14 is also grounded, to complete the path of current flow.

Since, as stated above, it is desirable for the resistors 31–37 to have a resistance which is substantially greater than the resistance of water between the respective electrodes, and in view of the fact that the voltage source in the airplane is limited, it is desirable to use a rather sensitive meter, for example, a moving coil or d'Arsonval type meter having a full scale deflection on the order of one milliampere.

For the purpose of limiting the maximum current which may flow through the circuit to the rating of the indicating instrument 15, a current-limiting resistor 45 is employed. This resistor in the present instance has a resistance of twelve thousand ohms, thus limiting the current, with a twelve volt supply, to one milliampere. In order further to insure that the current drawn from the storage battery is limited to a value which is safe considering the direct contact between the circuit and raw gasoline, a fuse 46 may be interposed between the battery and the current-limiting resistor having a rating which is just slightly greater than the value to which the current is limited by the resistor 45, i.e., on the order of the few milliamperes. The power thus available from the battery even under short circuit conditions is limited to a few hundredths of a watt which is incapable of producing a temperature sufficient to ignite raw gasoline.

In accordance with one of the important aspects of the invention, means are provided for giving a positive indication on the indicating meter 15, even in the absence of water in the gasoline, in order to indicate to the pilot that the measuring circuit is complete and operative. For this purpose, a circuit-completing resistor 50 is used which is connected between the lowermost electrode 21 and the conductive wall of the bowl 10, for example, by means of a jumper connection 51. This resistor is preferably several times larger in resistance than the resistors 31–37 in the string, and may, for example, have a resistance which is approximately equal to all of the resistors 31–37 taken together. Thus, when the control or master switch 16 is thrown to the "on" or "indicate" position, the circuit will be completed through ground through a loop circuit which has sufficient conductivity to move the indicator through a definite increment from its at rest position. The pilot can then be assured that the measuring circuit is complete and operative and will be effective to indicate the presence of water in the bowl if any is present.

In order to increase the sensitivity of the device to small amounts of water, the lowermost electrode 21 is preferably located closely adjacent the bottom of the bowl. The height may be lowered conveniently and effectively by providing a downwardly extending probe 21a which is secured to the electrode 21 and which is effective to detect the presence of water rising to a height $h$ within the bowl which may correspond, for example, to a total quantity of water of a half ounce or less.

In order to show how different heights of water in the bowl are indicated and displayed on the meter 15, it will be helpful to understand the present embodiment, including the preferred form of meter display, in some detail. Each of the resistors 31–37 may, for example, have a resistance of six thousand ohms, which is substantially higher than the resistance of water between the respective electrodes. The water normally present in gasoline usually has sufficient dissolved impurity so that it is a rather efficient electrolyte; thus, by comparison with the resistors, the resistance of water between the submerged electrodes may be assumed to be negligible. The circuit-completing resistor 50 may have a resistance of fifty thousand ohms. Under such conditions the deflections secured at the meter may be correlated with the height of the water in the bowl by means of the encircled numerals 1–9 inclusive, appearing on the electrodes and on the indicating meter.

When the switch 16 is turned "off," the indicating needle occupies the zero position. When the switch is turned "on" an immediate deflection to position one is noted, even in the absence of water. The resistance in the circuit under such conditions is 50,000+42,000 +12,000 ohms, resulting in a current of 0.115 milliampere. Such deflection may be accompanied on the meter by the legend "No water—Circuit OK" as shown. In the event that water collects in the bowl, a height $h$, i.e., sufficient to touch the lowermost end of the electrode probe 21a, the resistance in the circuit is reduced to 42,000+12,000 ohms, causing the current to increase to 0.222 milliampere. As additional water collects, it contacts electrodes 22, 23, and 24 in succession, resulting in currents of 0.250, 0.286, and 0.333 milliampere respectively. Such amounts of water are considered "safe" and the meter face may, in this region, be colored green and carry the legend "Small amount of water."

However, should the water further increase, the currents will increase progressively to 0.400 and 0.500 milliampere, indicating to the pilot that caution should be exercised. Currents in this order of magnitude may be accompanied by the legend as shown "Watch out for increase." Still further increases in the water level to bring the level up to the electrodes 27, 28 are accompanied by an increase of current to 0.666 milliampere and, finally, to 1.00 milliampere or full scale deflection. This portion of the meter face which occupies the upper half of the scale is distinctively colored in red and accompanied by the legend "Danger—Land and drain at once." Obviously, other specific scales or meter faces could be employed and other specific values of resistance may be used without departing from the present invention. It will be clear from the foregoing that the present device lends itself to a graphic display, the instructions to the pilot being self-explanatory and not requiring any specific knowledge or interpretation. This is particularly desirable in view of the large number of meters and indicators a pilot is called upon to observe at all times.

When using the present device, it is unnecessary for the pilot to drain the trap or bowl simply as a matter of course. Such operation is only indicated when the water level reaches a level in excess of that considered to be "safe." A conservative pilot could, of course, drain the water whenever the minimum amount indicated by the numeral (2) and corresponding to the height $h$ was present, with the assurance that all water difficulties would be avoided. Gasoline may now be taken on at small or remote air fields with the feeling of assurance that if water is present it will be immediately apparent on the indicator so that the bowl may be drained before attempting any take-off. An awkward and messy operation is avoided and a maximum of safety is assured. It is to be particularly noted that the invention involves only inexpensive components which are available as standard on the market and that the device may therefore be incorporated in the aircraft or installed in existing aircraft as a kit in order to take full advantage of the present invention.

If desired the invention may be employed with a nonconductive bowl simply by grounding the valve 11 on equivalent metallic drain fitting to provide a common ground with the battery 14.

While the device has been described in connection with an indicating meter, the current measuring means may take other forms without departing from the invention, such as calibrated relays, annunciators or the like. And while the arrangement is particularly applicable to a fuel system, it will be apparent that it may be used with equal advantage in a trap for detecting and measuring a heavy liquid impurity having conductive properties.

I claim as my invention:

1. In a water measuring device for a fuel system having a trap, the combination comprising an insulator arranged for mounting vertically in said trap, a wiring circuit including a series of electrode portions vertically spaced on said insulator, the lowermost electrode being spaced a short distance from the bottom of said trap, said circuit also including a series of resistor portions mounted on said insulator between respective and adjacent ones of said electrode portions, means for supplying current to said topmost electrode, means for measuring the current supplied thereto, means for completing the circuit between the bottom of the trap and said current source, and a resistor electrically connected between the lowermost one of said electrode portions and the bottom of said trap for giving a positive indication on said current measuring means even in the absence of any water in said trap.

2. In a water measuring device for a fuel system having a trap, the combination comprising a source of current having one side grounded, a first resistor having one end grounded with respect to the bottom of the trap, a first electrode spaced a short distance from the bottom of the trap and connected to the other end of the first resistor, a second electrode spaced in said trap at a level above the first electrode, a second resistor connected between said first and second electrodes, means including a series resistor for connecting said second electrode to said source of current, and means for measuring the flow of current from said current source, said resistors having a resistance which is sufficiently high as to cause an appreciable change in the reading of said measuring means as the level of the water rises from the bottom of the trap to the first electrode and from the first electrode to the second electrode.

3. In a water measuring device for a fuel system having a trap, the combination comprising a source of current, a series of electrodes arranged in said trap at progressive heights from the bottom, the bottom electrode being spaced a short distance from the bottom of the trap, resistors connected between said electrodes, means connecting the top electrode to said current source, means for completing a circuit from the bottom of said trap to said current source, means for measuring the amount of current drawn from said current source, the resistance of the resistors being sufficiently high as to cause an appreciable and easily detected change in the reading of the measuring means as the water level in the trap rises, and a current-completing resistor electrically connected between the lowermost electrode and the bottom of the trap for providing minimum indication on said current measuring means even in the absence of any water in said trap for indicating to the operator that the circuit is complete.

4. In a water measuring device for a fuel system having a trap, the combination comprising a source of current, a series of electrodes arranged in said trap at progressive heights from the bottom, the bottom electrode being spaced a short distance from the bottom of the trap, set of resistors respectively connected between said electrodes, means connecting the top electrode to said current source, means for completing a circuit from the bottom of said trap to said current source, means for measuring the amount of current drawn from said current source, the resistance of the resistors being sufficiently high as to cause an appreciable and easily detected change in the reading of the measuring means as the water level in the trap rises, and a circuit-completing resistor having a resistance which is higher than the resistors comprising said set, said circuit-completing resistor being electrically connected between the lowermost electrode and the bottom of the trap for providing minimum indication on said current measuring means even in the absence of any water in said trap for indicating to the operator that the circuit is complete.

5. In a water measuring device for a fuel system having a trap, the combination comprising a source of current, a series of electrodes arranged in said trap at progressive heights from the bottom, resistors connected between said electrodes, means connecting the top electrode to said current source, means for completing a circuit from the bottom of said trap to said current source, and means for measuring the amount of current drawn from said current source, the resistance of the resistors being sufficiently high as to cause an appreciable and easily detected change in the reading of the measuring means as the water level in the trap rises, and a circuit-completing resistor electrically connected between the lowermost electrode and the bottom of the trap for providing minimum indication on said current measuring means even in the absence of any water in said trap for indicating to the operator that the circuit is complete, the bottom having a probe extending closely adjacent the bottom of the trap and spaced therefrom at a spacing which is substantially less than the vertical spacing between the electrodes.

References Cited in the file of this patent

UNITED STATES PATENTS

| | | |
|---|---|---|
| 829,161 | Kjerulff | Aug. 21, 1906 |
| 2,289,202 | McCoy | July 7, 1942 |
| 2,589,714 | Lee | Mar. 18, 1952 |
| 2,688,872 | Hartline | Sept. 14, 1954 |